United States Patent
Gheorghiu et al.

(10) Patent No.: US 11,395,369 B2
(45) Date of Patent: Jul. 19, 2022

(54) METHODS, APPARATUSES AND SYSTEMS FOR DYNAMIC SPECTRUM SHARING BETWEEN LEGACY AND NEXT GENERATION NETWORKS

(71) Applicant: QUALCOMM Incorporated, San Diego, CA (US)

(72) Inventors: Valentin Alexandru Gheorghiu, Yokohama (JP); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/864,232

(22) Filed: May 1, 2020

(65) Prior Publication Data
US 2020/0351987 A1 Nov. 5, 2020

Related U.S. Application Data

(60) Provisional application No. 62/842,715, filed on May 3, 2019.

(51) Int. Cl.
*H04W 16/14* (2009.01)
*H04W 88/06* (2009.01)
(Continued)

(52) U.S. Cl.
CPC ........... *H04W 88/06* (2013.01); *H04L 5/0048* (2013.01); *H04W 16/14* (2013.01); *H04W 24/10* (2013.01);
(Continued)

(58) Field of Classification Search
CPC . H04W 88/06; H04W 16/14; H04W 72/1215; H04W 72/0446; H04W 24/10;
(Continued)

(56) References Cited

U.S. PATENT DOCUMENTS

| | | | |
|---|---|---|---|
| 2012/0263118 A1* | 10/2012 | Love | H04W 72/1215 370/329 |
| 2015/0148038 A1* | 5/2015 | Griot | H04W 24/02 455/435.3 |
| 2018/0070369 A1 | 3/2018 | Papasakellariou | |
| 2018/0145818 A1 | 5/2018 | Choi et al. | |

(Continued)

OTHER PUBLICATIONS

International Search Report and Written Opinion—PCT/US2020/031206—ISA/EPO—dated Mar. 26, 2021.
(Continued)

*Primary Examiner* — Julio R Perez
(74) *Attorney, Agent, or Firm* — Liem T. Do

(57) ABSTRACT

Methods, systems, and devices for wireless communication are described. In an aspect, a base station may determine a configuration of a first radio access technology (RAT) including a plurality of parameters associated with a plurality of first channels of the first RAT. The base station may also transmit a second channel associated with a second RAT different from the first RAT, the second channel overlapping with the first channels. In another aspect, a user equipment may receive a configuration of a first RAT including a plurality of parameters associated with a plurality of first channels of the first RAT. The UE may also receive a second channel associated with a second RAT different from the first RAT, the second channel overlapping with the first channels.

23 Claims, 16 Drawing Sheets

(51) Int. Cl.
  *H04W 72/12* (2009.01)
  *H04W 72/04* (2009.01)
  *H04W 24/10* (2009.01)
  *H04W 48/18* (2009.01)
  *H04L 5/00* (2006.01)
  *H04W 36/14* (2009.01)

(52) U.S. Cl.
  CPC .......... *H04W 36/14* (2013.01); *H04W 48/18* (2013.01); *H04W 72/0446* (2013.01); *H04W 72/1215* (2013.01)

(58) Field of Classification Search
  CPC ..... H04W 48/18; H04W 36/14; H04W 48/16; H04W 36/0066; H04W 72/1289; H04L 5/0048; H04L 5/0055; H04L 5/0062; H04L 27/0006; H04L 5/0023; H04L 5/0058; H04L 5/001; H04L 5/0037; H04L 5/0007
  See application file for complete search history.

(56) References Cited

U.S. PATENT DOCUMENTS

2019/0013881 A1* 1/2019 Olesen .................. H04W 16/14
2019/0021014 A1* 1/2019 Martin .................. H04W 24/10
2019/0037418 A1* 1/2019 Gunasekara ........ H04W 52/245

OTHER PUBLICATIONS

Nokia, et al., "Summary of Open Issues Related to Rate-Matching in NR", 3GPP TSG-RAN WG1 #93, 3GPP Draft; R1-1807705, 7_1_3_5_RAN1_93_SUMMARYV2, 3rd Generation Partnership Project (3GPP), Mobile Competence Centre; 650, Route Des Lucioles; F-06921 Sophia-Antipolis Cedex; France, vol. RAN WG1, No. Busan, South Korea; May 21, 2018-May 25, 2018, May 24, 2018 (May 24, 2018), 10 Pages, XP051463334, Retrieved from the Internet: URL: http://www.3gpp.org/ftp/tsg%5Fran/WG1%5FRL1/TSGR1%5F93/Docs [retrieved on May 24, 2018] the whole document.

* cited by examiner

METHODS, APPARATUSES AND SYSTEMS FOR DYNAMIC SPECTRUM SHARING BETWEEN LEGACY AND NEXT GENERATION NETWORKS

CROSS REFERENCE

The present Application for Patent claims priority to U.S. Provisional Application No. 62/842,715 by Valentin Gheorghiu et al., entitled "METHODS, APPARATUSES AND SYSTEMS FOR DYNAMIC SPECTRUM SHARING BETWEEN LEGACY AND NEXT GENERATION NETWORKS," filed May 3, 2019, which is hereby incorporated by reference in its entirety as if fully set forth below and for all applicable purposes.

BACKGROUND

The following relates generally to wireless communication, and more specifically to methods, apparatuses, and systems for dynamic spectrum sharing with multiple LTE channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some deployments, operators may want to transition from a legacy network (e.g., LTE network) to the next generation of wireless networks (e.g., NR network) to provide more advanced features, such as, enhanced broadband, reduced latency, and improved reliability. One of the challenges to enable such a transition is how to efficiently re-farm spectrum between the LTE network and NR network to provide wireless service to legacy devices on the LTE network and new devices on the NR network during the transition time period. Therefore, improved techniques for dynamic spectrum sharing with multiple LTE channels may be desirable.

SUMMARY

The described techniques relate to improved methods, systems, devices, and apparatuses that support micro-sleep operation in shared spectrum. In an aspect, a method for wireless communications includes receiving, at a user equipment (UE), a configuration of a first radio access technology (RAT) including a plurality of parameters associated with a plurality of first channels of the first RAT. The method also includes receiving, at the UE, a second channel associated with a second RAT different from the first RAT. The second channel of the second RAT overlaps with the plurality of first channels of the first RAT in a frequency domain.

In another aspect, a method for wireless communications includes determining, by a base station (BS), a configuration of a first radio access technology (RAT) including a plurality of parameters associated with a plurality of first channels of the first RAT. The method also includes transmitting, from the BS, a second channel associated with a second RAT different from the first RAT. The second channel of the second RAT overlaps with the plurality of first channels of the first RAT in a frequency domain.

In some aspects, a UE for wireless communications includes a processor, memory in electronic communication with the processor, and instructions stored in the memory. The instructions are executable by the processor to receive a configuration of a first radio access technology (RAT) including a plurality of parameters associated with a plurality of first channels of the first RAT; and receive a second channel associated with a second RAT different from the first RAT, wherein the second channel of the second RAT overlaps with the plurality of first channels of the first RAT in a frequency domain.

In still other aspects, a BS for wireless communication includes a processor, memory in electronic communication with the processor, and instructions stored in the memory. The instructions are executable by the processor to determine a configuration of a first radio access technology (RAT) including a plurality of parameters associated with a plurality of first channels of the first RAT; and transmitting a second channel associated with a second RAT different from the first RAT, wherein the second channel of the second RAT overlaps with the plurality of first channels of the first RAT in a frequency domain.

In some other aspects, a non-transitory computer-readable medium storing code for wireless communications is provided. The code includes instructions executable to receive, at a user equipment (UE), a configuration of a first radio access technology (RAT) including a plurality of parameters associated with a plurality of first channels of the first RAT; and to receive, at the UE, a second channel associated with a second RAT different from the first RAT, wherein the second channel of the second RAT overlaps with the plurality of first channels of the first RAT in a frequency domain.

In some aspects, a non-transitory computer-readable medium storing code for wireless communications is provided. The code includes instructions executable to determine, by a base station (BS), a configuration of a first radio access technology (RAT) including a plurality of parameters associated with a plurality of first channels of the first RAT; and to transmit, from the BS, a second channel associated with a second RAT different from the first RAT, wherein the second channel of the second RAT overlaps with the plurality of first channels of the first RAT in a frequency domain.

In other aspects, an apparatus for wireless communications includes means for receiving, at a user equipment (UE), a configuration of a first radio access technology (RAT) including a plurality of parameters associated with a plurality of first channels of the first RAT; and means for receiving, at the UE, a second channel associated with a second RAT different from the first RAT, wherein the second channel of the second RAT overlaps with the plurality of first channels of the first RAT in a frequency domain.

In another aspect, an apparatus for wireless communications includes means for determining, by a base station (BS), a configuration of a first radio access technology (RAT) including a plurality of parameters associated with a plurality of first channels of the first RAT; and means for transmitting, from the BS, a second channel associated with a second RAT different from the first RAT, wherein the second channel of the second RAT overlaps with the plurality of first channels of the first RAT in a frequency domain.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appvended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
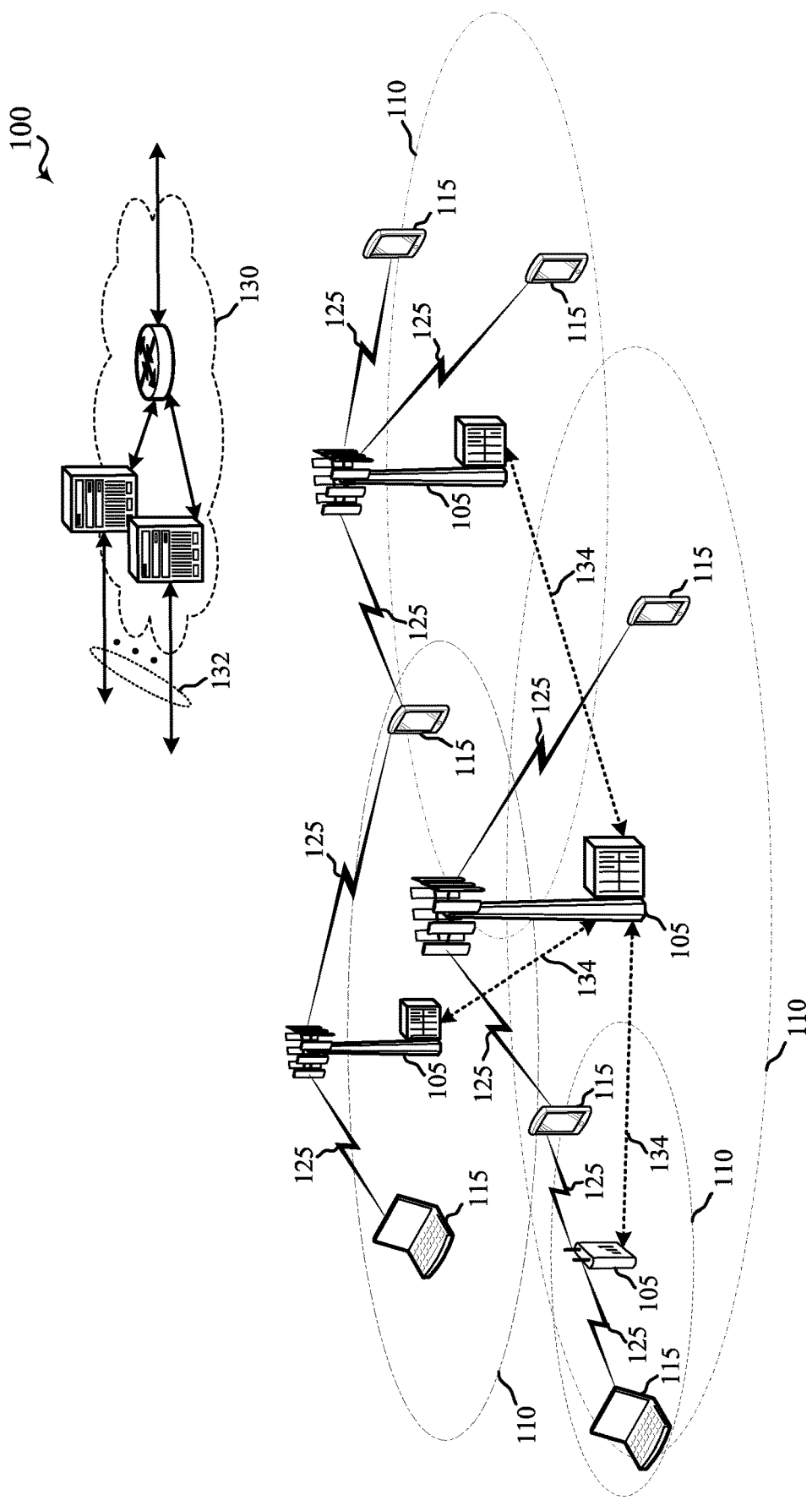
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an 51 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology (RAT). Each physical layer channel may carry user data, control information, or other signaling. A carrier may be associated with a predefined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

It may be desirable for an operator who currently provides wireless service via a legacy network, such as an LTE network, to transition to a next generation RAT, such as NR. In this regard, dynamic spectrum sharing between LTE and NR is a technique to enable a smooth transition when spectrum is re-farmed. In some scenarios, the operator may own multiple LTE channels and may want to deploy NR over these channels to provide advanced wireless service to new devices (e.g., NR UEs). Furthermore, it may be important to continue to provide wireless service to its current legacy devices (e.g., LTE UEs) during the transition period. Accordingly, techniques for dynamic spectrum sharing with multiple LTE channels within an NR network are disclosed in detail below.

Figure 2:
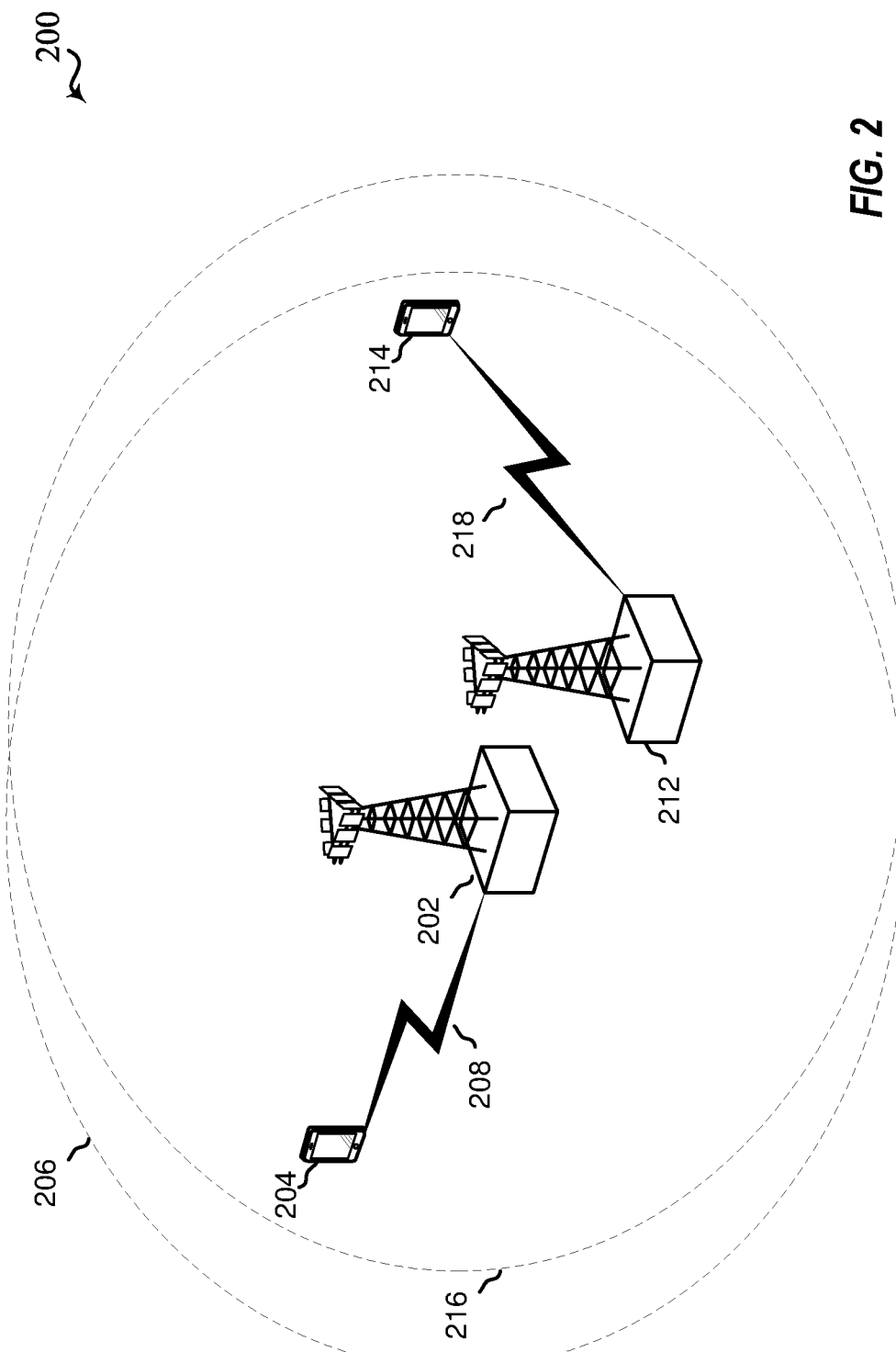
FIG. 2 illustrates a system for supporting dynamic spectrum sharing between a legacy network and a next generation network in accordance with aspects of the present disclosure.

FIG. 2 illustrates a system 200 for supporting dynamic spectrum sharing between a legacy network and a next generation network in accordance with aspects of the present disclosure. The system 200 may correspond to a portion of the wireless communications system 100 in FIG. 1. The system 200 may include a next generation network (e.g., NR network) overlaid over a legacy network (e.g., LTE network). The NR network may include a base station 202 (e.g., gNB) providing wireless service to a UE 204 (e.g., NR UE) within a coverage area 206. The base station 202 may communicate with the UE 204 over a radio link 208 based on an NR radio access network (RAN) protocol. The LTE network may include a base station 212 (e.g., eNB) providing wireless service to a UE 214 (e.g., LTE UE) within a coverage area 216. The base station 212 may communicate with the UE 214 over a radio link 218 based on an LTE RAN protocol. The base stations 202, 212 may be substantially similar to the BS 105 in FIG. 1, and the UEs 204, 214 may be substantially similar to the UE 115 in FIG. 1. Although FIG. 2 illustrates one base station and one UE in each network for purposes of simplicity of discussion, it will be recognized that embodiments of the present disclosure may scale to many more base stations and UEs for each network.

In some deployments, the base stations 202, 212 may be co-located as shown. An operator may currently deploy the legacy network with base stations (e.g., base station 212) located within a geographical area. The operator may add next generation base stations (e.g., base station 202) at substantially the same locations as the legacy base stations since the infrastructure (e.g., tower, backhaul, etc.) may be already in place. Accordingly, the coverage areas 206, 216 may have an overlapping region. Additionally, the base stations 202, 212 may operate over the same spectrum or at least overlapping spectrum as will be disclosed in greater detail below. In an aspect, the base station 202 may operate over one or more NR carriers (may also be referred to as NR channels), which may have a bandwidth of 5 MHz, 10 MHz, 15 MHz, 20 MHz, 25 MHz, 30 MHz, etc. The base station 212 may operate over one or more LTE carriers (may also be referred to as LTE channels), which may have a bandwidth of 1.4 MHz, 3 MHz, 5 MHz, 10 MHz, 15 MHz, or 20 MHz. In other deployments, the bases stations 202, 212 may not be co-located but still may have some overlapping coverage areas.

The operator may implement dynamic spectrum sharing between the base stations 202 and 212 to enable a smooth transition between the LTE RAT and NR RAT. In this regard, the operator may provide new advanced wireless service to the UE 204 as well as continue wireless service to the UE 214 during the transition period. In an aspect, the operator may currently own multiple LTE carriers (or channels) that are utilized by the base station 212, and may deploy an NR carrier (or channel) with a wider bandwidth over these LTE carriers as will be disclosed in greater detail below. The base station 202 may utilize this NR carrier to communicate with the UE 204.

Figure 3:
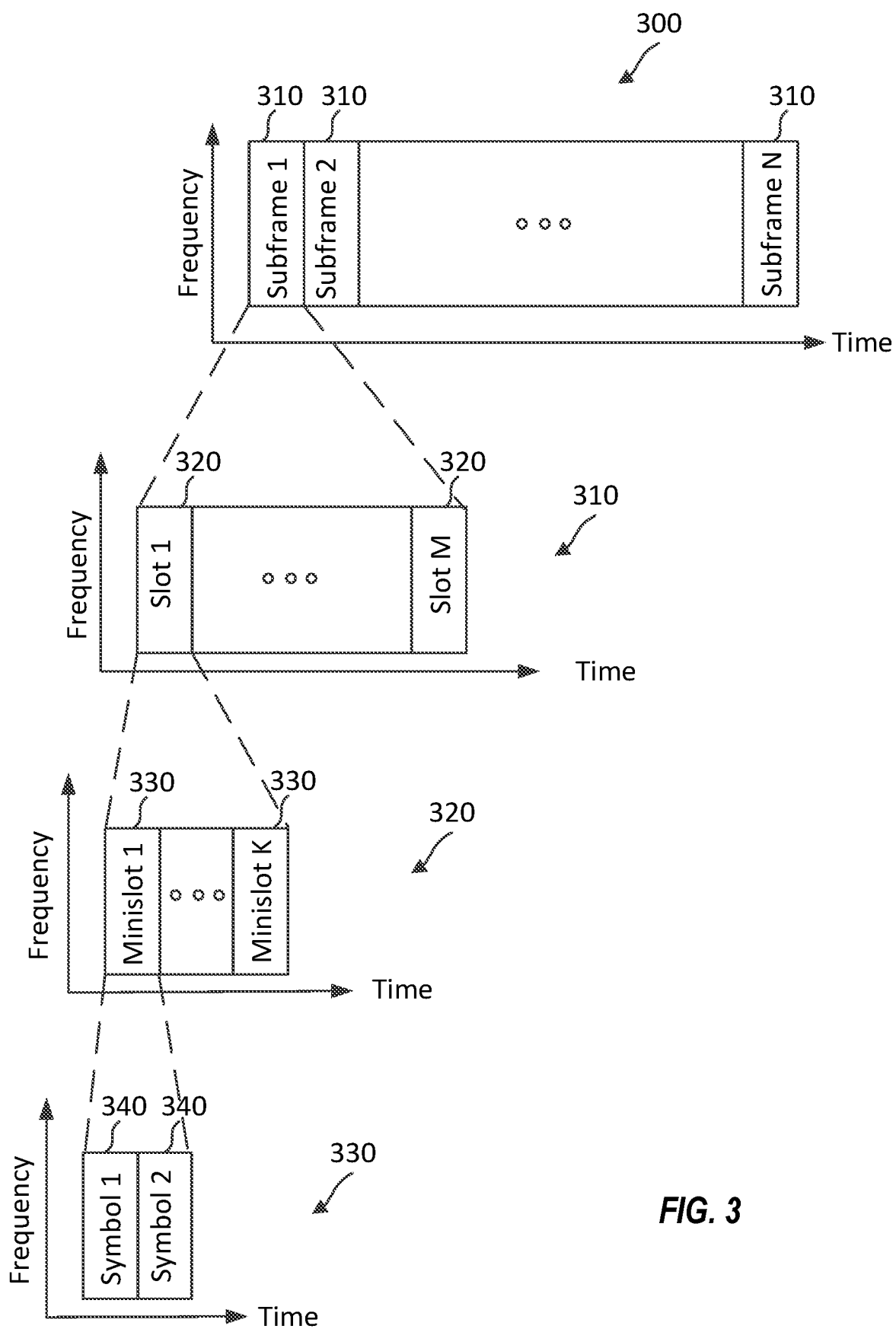
FIG. 3 illustrates a radio frame employed by a legacy network and a next generation network in accordance with aspects of the present disclosure.

FIG. 3 illustrates a radio frame 300 employed by a legacy network and a next generation network in accordance with aspects of the present disclosure. The radio frame 300 may be employed by the system 100 and the system 200. In an aspect, the legacy network includes an LTE network, and the next generation network includes an NR network. For example, base stations such as the base stations 105, 202, and 212 and UEs such as the UEs 115, 204, and 214 may exchange data using the radio frame 300. In FIG. 3, the x-axes represent time in some constant units and the y-axes represent frequency in some constant units. The radio frame 300 includes N plurality of subframes 310 spanning in time and frequency. In an aspect, a radio frame 300 may span a time interval of about 10 milliseconds (ms). Each subframe 310 may include M plurality of slots 320. Each slot 320 may include K plurality of mini-slots 330. Each mini-slot 330 may include one or more symbols 340. N, M, and K may be any suitable positive integers. The base stations or the UEs may send data in units of subframes 310, slots 320, or mini-slots 330. In some aspects, the slots 320 may not be aligned to the mini-slots 330 as shown. For example, a subframe 310 may include a number of mini-slots 330 with a variable number of symbols 340 (e.g., 2, 4, 7 symbols). It is understood that the slot and mini-slot definition may be different in NR as compared to LTE as discussed below.

In NR, multiple OFDM numerologies are supported, such as, 15 kHz, 30 kHz, 60 kHz, 120 kHz, and 240 kHz, which specifies a subcarrier spacing (SCS) configuration for an NR carrier. The configured SCS (and cyclic prefix (CP)) for an NR carrier may determine the number of symbols per slot, slots per subframe, and slots per radio frame. For example, for a 15 kHz SCS (and normal CP), there are 14 OFDM symbols per slot, 1 slot per subframe, and 10 slots per radio frame. In another example, for 30 kHz SCS (and normal CP), there are 14 symbols per slot, 2 slots per subframe, and 20 slots per radio frame. It is understood that the number of OFDM symbols per slot in NR may be different for extended CP.

In LTE, 15 kHz SCS is the OFDM numerology supported for normal CP, which may be defined with 7 OFDM symbols per slot, 2 slots per subframe, and 20 slots per radio frame. It is noted that other subcarrier spacings are available for extended CP configurations, and the number of OFDM symbols per LTE slot may be different for extended CP. Accordingly, for an LTE carrier and NR carrier with 15 kHz SCS (and normal CP), one NR slot may be equivalent to one LTE subframe (or two LTE slots).

Figure 4:
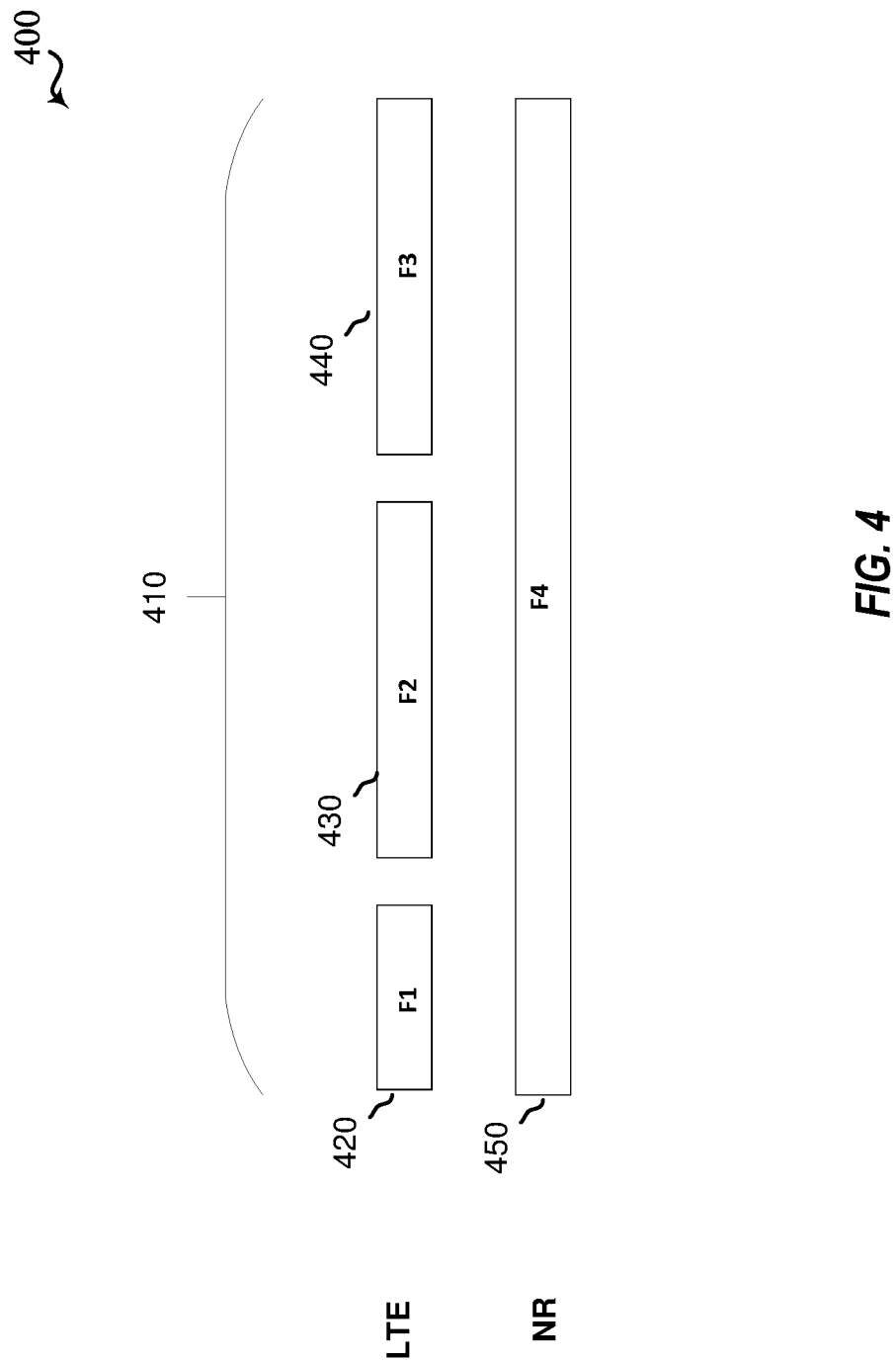
FIG. 4 illustrates a spectrum diagram for supporting dynamic spectrum sharing between a legacy network and a next generation network in accordance with aspects of the present disclosure.

FIG. 4 illustrates a spectrum diagram 400 for supporting dynamic spectrum sharing between a legacy network and a next generation network in accordance with various aspects of the present disclosure. In an aspect, the legacy network includes an LTE network, and the next generation network includes an NR network. The spectrum diagram 400 may depict a frequency band 410 used for wireless communications between the base stations (e.g., base stations 202, 212 in FIG. 2) and UEs (e.g., UEs 204, 214 in FIG. 2). The frequency band 410 may be in the range of 300 MHz to 300 GHz. Here, the frequency band 410 may include a plurality of LTE channels (or carriers) which may be noted as a first LTE channel (F1) 420, a second LTE channel (F2) 430, and a third LTE channel (F3) 440. In an aspect, the F1 channel 420 may have a channel bandwidth of 10 MHz, the F2 channel 430 may have a channel bandwidth of 20 MHz, and the F3 channel 440 may have a channel bandwidth of 20 MHz. The LTE channels 420, 430, 440 may support downlink or uplink communications between the base stations (e.g., base station 212 in FIG. 2) and UEs (e.g., UE 214 in FIG. 2).

Each LTE channel 420, 430, 440 may have a smaller transmission bandwidth than the specified channel bandwidth. In this regard, the bandwidth available for transmission of information may be smaller than the channel bandwidth. For a 10 MHz channel bandwidth, the transmission bandwidth may be specified as 9 MHz (for 15 kHz SCS) available for transmission of information. For a 20 MHz channel bandwidth, the transmission bandwidth may be specified as 18 MHz (for 15 kHz SCS) available for transmission of information. Furthermore, each LTE channel 420, 430, 440 may have a guardband (not shown) on either side or edge of the channel.

In some aspects, the frequency band 410 may also include an NR channel (or carrier) 450 that overlaps the F1 channel 420, F2 channel 430, and F3 channel 440 as shown. Here, the NR channel 450 may have a channel bandwidth of 50 MHz, and may be used for downlink or uplink communications between the base stations (e.g., base station 202 in FIG. 2) and UEs (e.g., UE 204 in FIG. 2). For a 50 MHz channel bandwidth, the transmission bandwidth may be specified as 48.6 MHz (for 15 kHz SCS) available for transmission of information. Additionally, the NR channel 450 may have a guardband (not shown) on either side or edge of the channel. In other aspects, there may be portions of the NR channel 450 that may not overlap any of the LTE channels 420, 430, 440 based on the transmission bandwidth and guardbands of the LTE channels.

It is understood that the particular channel bandwidths and transmission bandwidths of the NR channel and LTE channels disclosed above in FIG. 4 are mere examples, and that aspects of the present disclosure apply to other bandwidth values as well. Moreover, the NR channel 450 may overlap at least two or more LTE channels (e.g., two LTE channels, three LTE channels, four LTE channels, etc.). The operator may deploy such a configuration to support dynamic spectrum sharing between LTE and NR. In order for the new UEs to effectively operate in such a deployment, the UEs may need to obtain information about the LTE channels (or channels) and signals transmitted over those channels. Additionally, the UEs may implement techniques for utilizing this information to properly decode the NR channel as will be disclosed later in greater detail.

Figure 5:
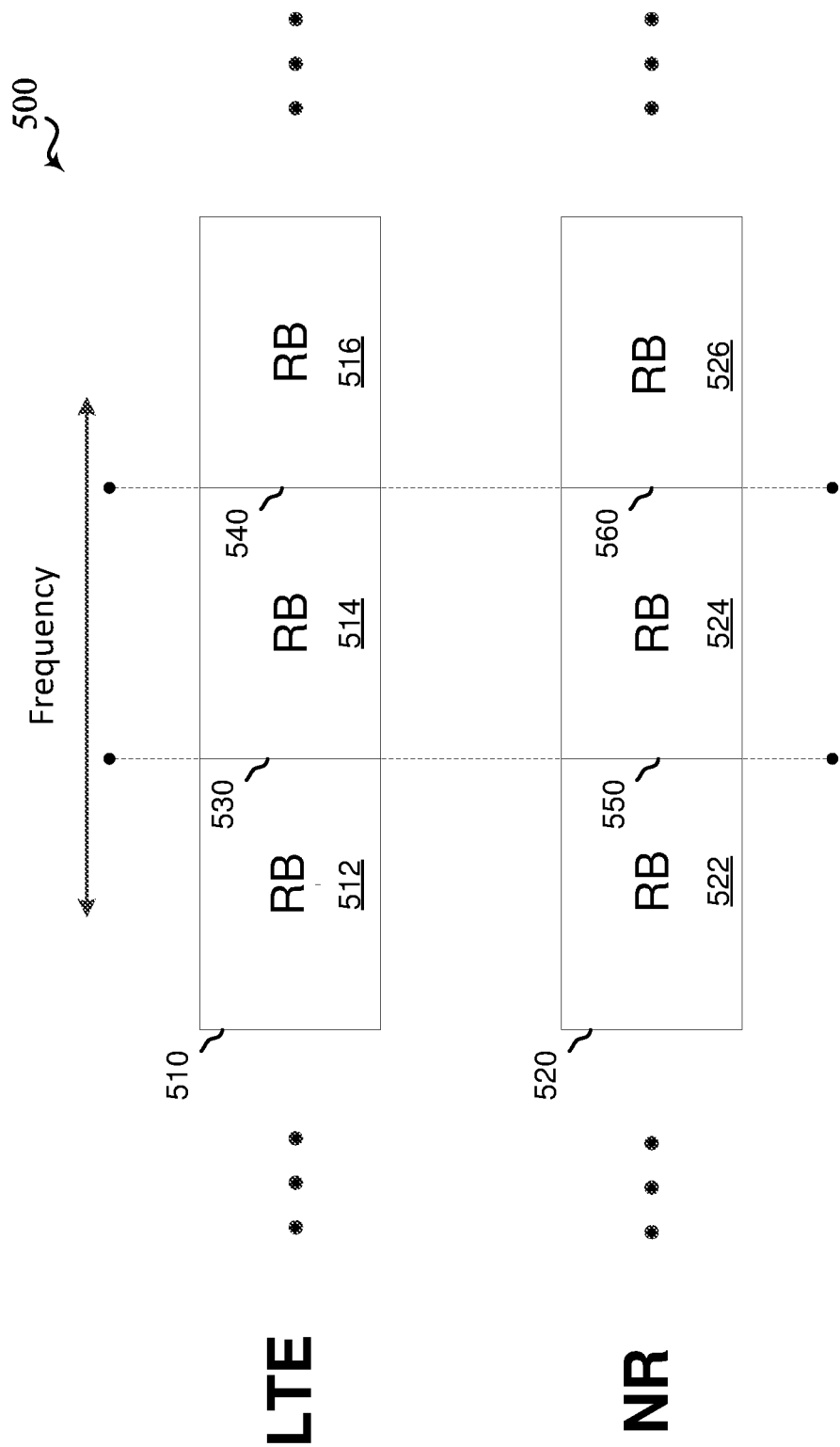
FIG. 5 illustrates a diagram of resource block (RB) alignment between a legacy carrier/channel and a next generation carrier/channel in accordance with aspects of the present disclosure.

FIG. 5 illustrates a diagram 500 of resource block alignment between a legacy carrier/channel and a next generation carrier/channel in accordance with various aspects of the present disclosure. In an aspect, the legacy carrier/channel includes an LTE carrier/channel, and the next generation carrier/channel includes an NR carrier/channel. In FIG. 5, the x-axes represent frequency in some constant units. The diagram 500 shows a portion of an LTE channel (or carrier) 510 and a portion of an NR channel (or carrier) 520. The LTE channel 510 may correspond to one of the LTE channels 420, 430, 440 in FIG. 4. The NR channel 520 may correspond to the NR channel 450 in FIG. 4. In an aspect, the LTE channel 510 may be partitioned into a plurality of resource blocks (RBs) 512, 514, 516 with a predefined number of subcarriers in a frequency domain. For 15 kHz SCS and normal CP, each RB may include 12 subcarriers. Accordingly, each RB has a bandwidth of 180 kHz and may be identified by an index in the frequency domain. The number of RBs available for transmission may depend on the transmission bandwidth of the LTE channel. For a 10 MHz channel (e.g., LTE channel 420 in FIG. 4) with 15 kHz SCS and normal CP, there are 50 RBs available for transmission with an index numbered from 0 to 49. For a 20 MHz channel (e.g., LTE channel 430, 440 in FIG. 4) with 15 kHz SCS and normal CP, there are 100 RBs available for transmission with an index numbered from 0 to 99.

The NR channel 520 may be partitioned into a plurality of RBs 522, 524, 526 with a predefined number of subcarriers in a frequency domain. For 15 kHz SCS and normal CP, each RB may include 12 subcarriers. Accordingly, each RB has a bandwidth of 180 kHz and may be identified by an index in the frequency domain. The number of RBs available for transmission may depend on the transmission bandwidth of the NR channel. For a 50 MHz channel (e.g., NR channel 450 in FIG. 4) with 15 kHz SCS and normal CP, there are 270 RBs available for transmission.

Here, RBs 512, 514, 516 of the LTE channel 510 are substantially aligned with RBs 522, 524, 526 of the NR channel 520 in the frequency domain. More specifically, the RB 514 may have boundaries 530, 540 that are substantially aligned with respective boundaries 550, 560, of the RB 524 in the frequency domain. Therefore, there may be a one-to-one mapping of LTE RBs to NR RBs (e.g., LTE RB 514-NR RB 524).

Additionally, referring back to FIG. 4, the NR channel may overlap multiple LTE channels, and the RBs of the NR channel may be substantially aligned with the RBs of all the multiple LTE channels. Accordingly, the center frequencies between the LTE channels (e.g., LTE channels 420, 430, 440 in FIG. 4) may be an integer multiple of 180 kHz (e.g., 15 kHz SCS×12 subcarriers).

Figure 6:
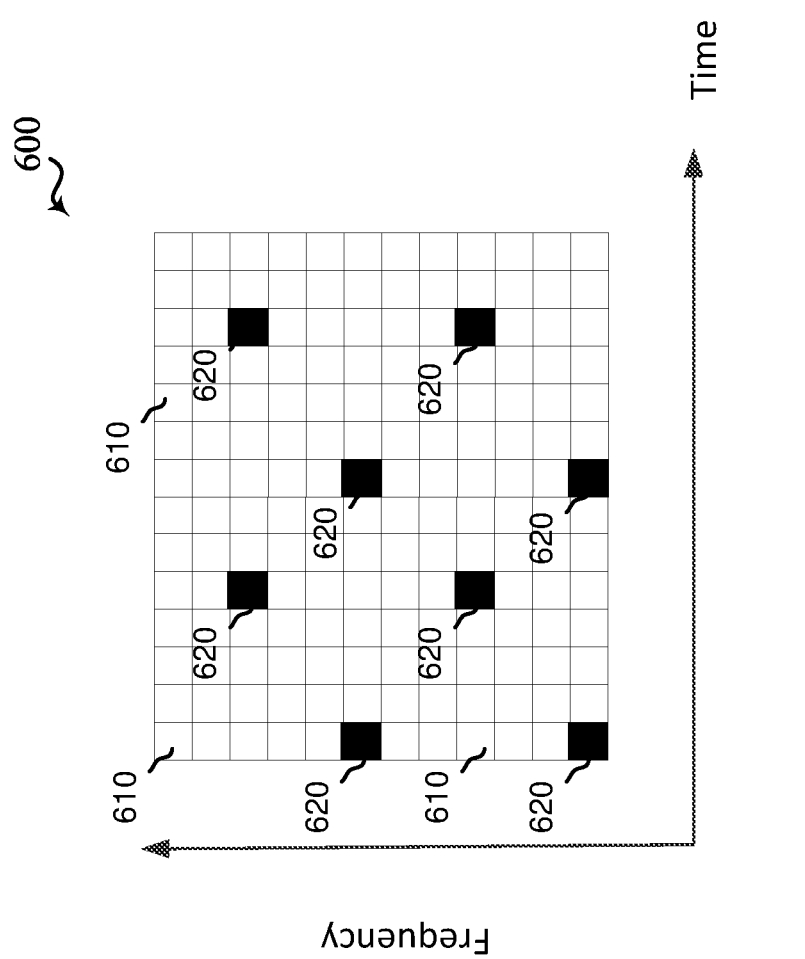
FIG. 6 illustrates a resource grid for transmission of legacy signals and/or next generation signals in accordance with aspects of the present disclosure.

FIG. 6 illustrates a resource grid 600 for transmission of legacy signals or next generation signals in accordance with various aspects of the present disclosure. In an aspect, the legacy signals include LTE signals, and the next generation signals include NR signals. In FIG. 6, the x-axes represent time in some constant units and the y-axes represent frequency in some constant units. In an aspect, the resource grid 600 may correspond to a configuration of 15 kHz SCS and normal CP, which illustrates 14 OFDM symbols (x-axes) and 12 subcarriers (y-axes) for ease of discussion. The resource grid 600 may correspond to one NR time slot or two LTE time slots. The size of the grid may depend on the transmission bandwidth of the LTE channel or the NR channel. The resource grid 600 may be partitioned into a plurality of resource elements (REs) 610. Each RE 610 may be identified by (k, l), where k is the index in the frequency domain and/corresponds to the symbol position in the time domain. The resource grid 600 may be employed by the LTE channel or NR channel for transmission of various signals, such as reference signals, synchronization signals, control signals, data signals, or the like.

In LTE, there may be signals that are transmitted continuously or persistently in each LTE channel. For example, a cell-specific reference signal or common reference signal (CRS) may be transmitted in every subframe and across the entire bandwidth of the LTE channel. Additionally, the CRS may be transmitted from one or more antenna ports. The LTE UEs (e.g., UE 214 in FIG. 2) may use the CRS to determine channel quality, frequency and/or timing offset adjustments, measurement reports, or the like. Here, the CRS may be transmitted in REs 620 from one antenna port. The configuration of the CRS (e.g., location, pattern, sequence, etc.) may be determined based on various parameters associated with the LTE channel. In an aspect, the parameters may include one or more of a channel position, a bandwidth, a cell identification, a number of antenna ports, a multicast broadcast signal frequency network (MBSFN) configuration, or an uplink/downlink (UL/DL) configuration.

As discussed above, the NR channel (e.g., NR channel 450 in FIG. 4) and LTE channels (e.g., LTE channels 420, 430, 440 in FIG. 4) may overlap in the frequency domain. Accordingly, NR signals, such as PDCCH, PDSCH or the like, may be rate matched around the LTE signals, such as CRS, to support dynamic spectrum sharing between LTE and NR. In this regard, the NR base station (e.g., base station 202 in FIG. 2) may map the NR signals to REs 610 that are not occupied by the CRS in REs 620. The NR UEs (e.g., UE 204 in FIG. 2) may obtain the CRS configuration from the NR base station to properly receive and decode the NR signals as will be discussed later in greater detail. Additionally, the LTE UEs (e.g., UE 214 in FIG. 2) may receive the CRS with minimal interference from the NR signals and operate satisfactorily within the wireless communication system (e.g., system 200 In FIG. 2).

Although FIG. 6 discloses LTE CRS, it is understood that other LTE signals may be applicable as well even though they are transmitted less frequently than the CRS, such as, channel state information reference signal (CSI-RS), synchronization signals (e.g., primary synchronization signal (PSS) and secondary synchronization signal (SSS)).

Figure 7:
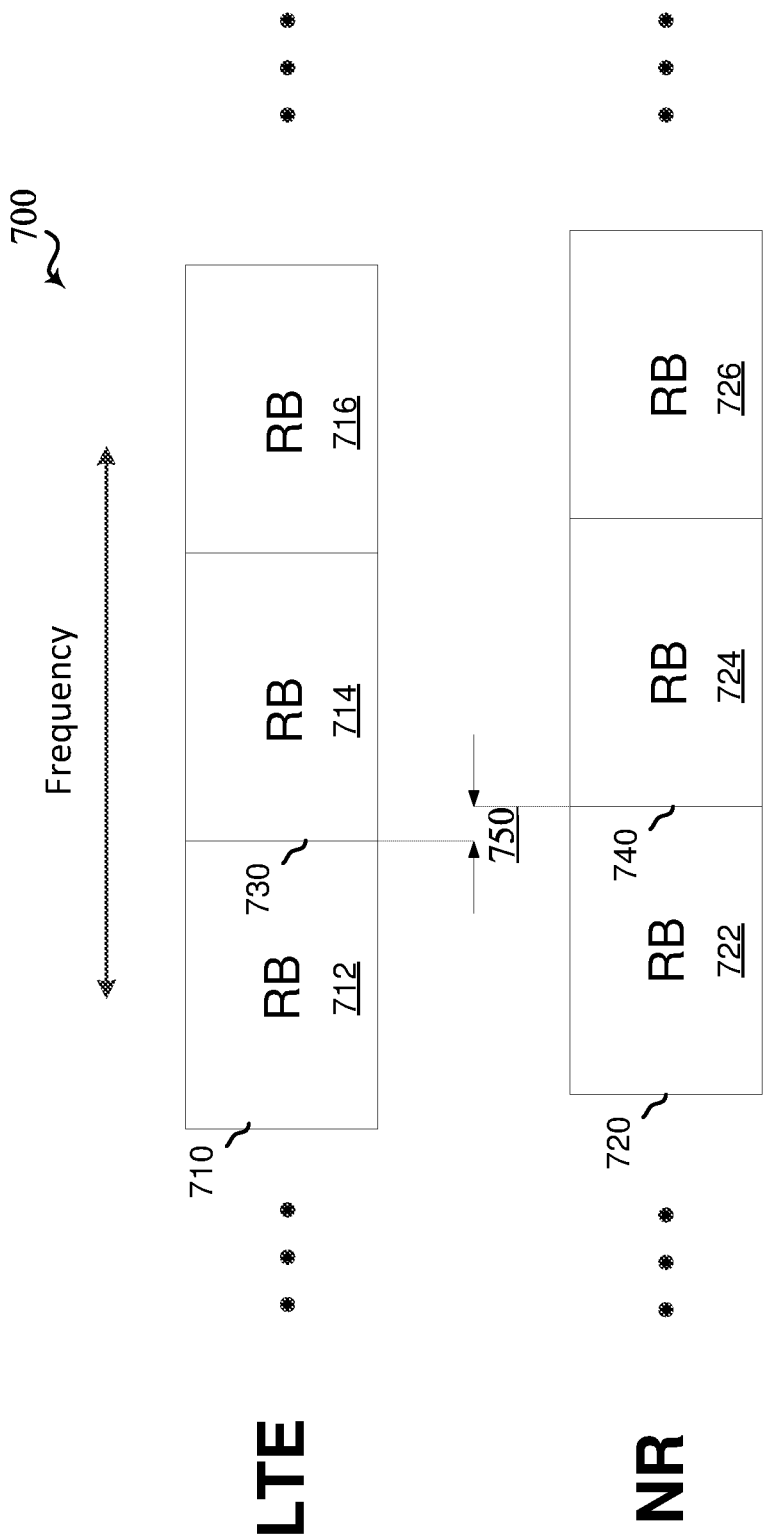
FIG. 7 illustrates a diagram of resource block (RB) unalignment between a legacy carrier/channel and a next generation carrier/channel in accordance with aspects of the present disclosure.

FIG. 7 illustrates a diagram 700 of resource block unalignment between a legacy carrier/channel and a next generation carrier/channel in accordance with various aspects of the present disclosure. In an aspect, the legacy carrier/channel includes an LTE carrier/channel, and the next generation carrier/channel includes an NR carrier/channel. In FIG. 7, the x-axes represent frequency in some constant units. The diagram 700 is similar to the diagram 500 disclosed in FIG. 5 except that the RBs of the LTE channel may not be aligned with the RBs of the NR channel in the frequency domain. More specifically, the diagram 700 shows a portion of an LTE channel (or carrier) 710 and a portion of an NR channel (or carrier) 720. The LTE channel 710 may correspond to one of the LTE channels 420, 430, 440 in FIG. 4. The NR channel 720 may correspond to the NR channel 450 in FIG. 4. In an aspect, the LTE channel 710 may be partitioned into a plurality of resource blocks (RBs) 712, 714, 716 with a predefined number of subcarriers in a frequency domain. For 15 kHz SCS and normal CP, each RB may include 12 subcarriers. Accordingly, each RB has a bandwidth of 180 kHz and may be identified by an index in the frequency domain. The number of RBs available for transmission may depend on the transmission bandwidth of the LTE channel. For a 10 MHz channel (e.g., LTE channel 420 in FIG. 4) with 15 kHz SCS and normal CP, there are 50 RBs available for transmission with an index numbered from 0 to 49. For a 20 MHz channel (e.g., LTE channel 430, 440 in FIG. 4) with 15 kHz SCS and normal CP, there are 100 RBs available for transmission with an index numbered from 0 to 99.

The NR channel 720 may be partitioned into a plurality of RBs 722, 724, 726 with a predefined number of subcarriers in a frequency domain. For 15 kHz SCS and normal CP, each RB may include 12 subcarriers. Accordingly, each RB has a bandwidth of 180 kHz and may be identified by an index in the frequency domain. The number of RBs available for transmission may depend on the transmission bandwidth of the NR channel. For a 50 MHz channel (e.g., NR channel 450 in FIG. 4) with 15 kHz SCS and normal CP, there are 270 RBs available for transmission.

Here, RBs 712, 714, 716 of the LTE channel 710 are not aligned with RBs 722, 724, 726 of the NR channel 720 in the frequency domain. More specifically, the RB 714 may have a boundary 730 that may be offset 750 with respect to a boundary 740 of the RB 724 in the frequency domain. The offset 750 may correspond to a number of subcarriers in the frequency domain. In some aspects, the NR UEs may determine the offset 750 based on information received from the base station as will be discussed in greater detail below.

Figure 8:
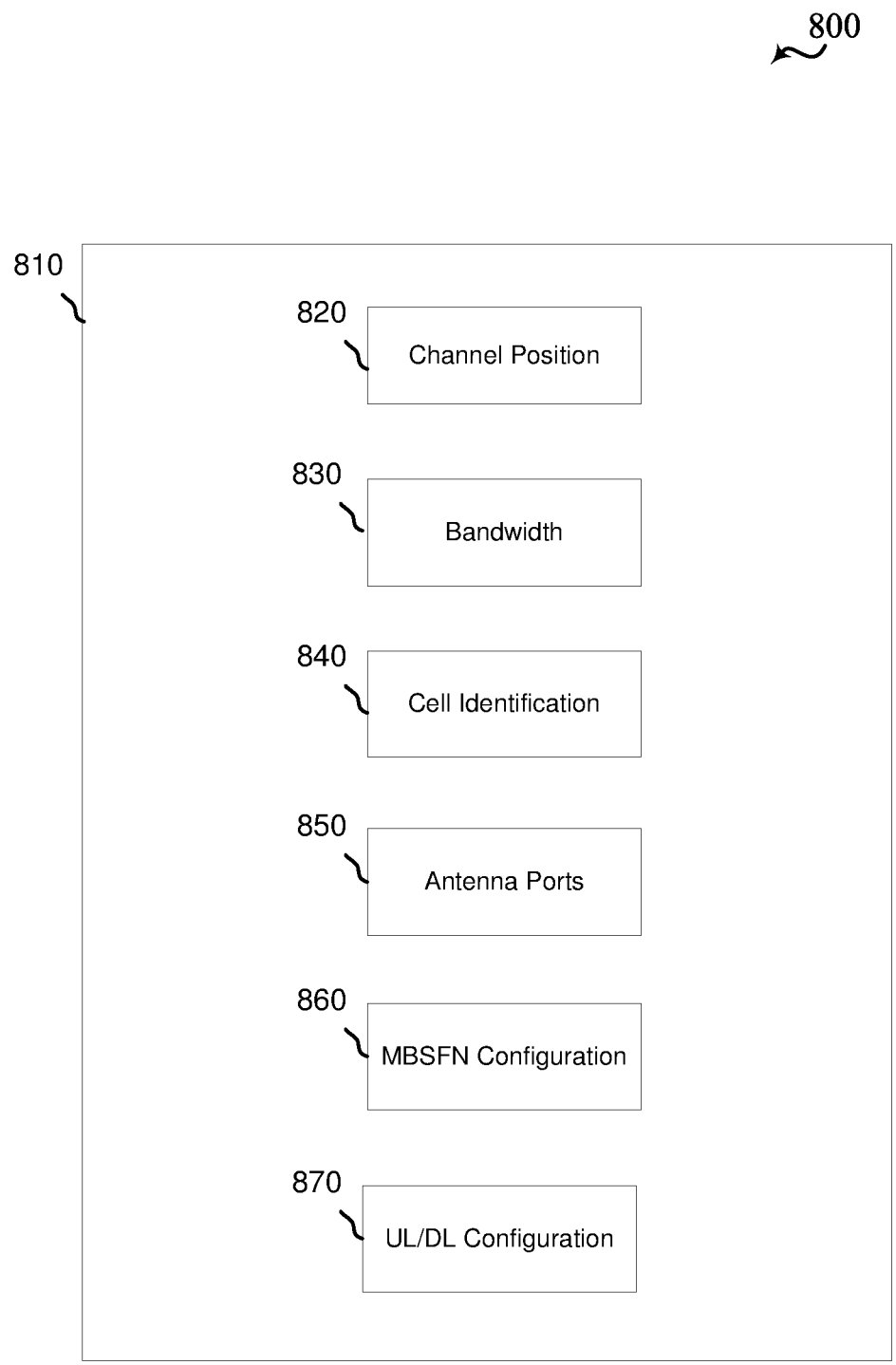
FIG. 8 illustrates a block diagram of a configuration including a plurality of parameters associated with a legacy carrier/channel in accordance with aspects of the present disclosure.

FIG. 8 illustrates a block diagram of a configuration 800 including a plurality of parameters 810 for a legacy carrier/channel in accordance with various aspects of the present disclosure. In an aspect, the legacy carrier/channel includes an LTE carrier/channel. As discussed above, the NR UEs (e.g., UE 204 in FIG. 2) may obtain information associated with the LTE channels (e.g., LTE channels 420, 430, 440 in FIG. 4) that overlap the NR channel (e.g., NR channel 450 in FIG. 4). Accordingly, the base station (e.g., base station 202 in FIG. 2) send the configuration 800 to. In an aspect, the parameters 810 may include one or more of a channel position 820, a bandwidth 830, a cell identification 840, a number of antenna ports 850, a multicast broadcast signal frequency network (MBSFN) configuration 860, or an uplink/downlink (UL/DL) configuration 870. The NR UE can determine, based on the parameters 810, the location (e.g., time-frequency resources) of LTE signals transmitted in each of the LTE channels.

In some examples, the channel position 820 may correspond to the position of the LTE channel within the frequency band (e.g., frequency band 410 in FIG. 4). More specifically, each LTE channel may be associated with an EARFCN, and may be positioned according to a channel raster.

In some examples, the bandwidth 830 may correspond to the channel bandwidth (e.g., 1.4 MHz, 3 MHz, 5 MHz, 10 MHz, 15 MHz, or 20 MHz) of the LTE channel.

In other examples, the cell identification 840 may correspond to a physical cell identification (PCI) associated with the LTE channel.

In some examples, the number of antenna ports 850 may correspond to one or more antenna ports used for transmission LTE signals over the LTE channel. In an example, one antenna port is shown in FIG. 6 for transmission of LTE CRS.

In some other examples, the MBSFN configuration 860 may correspond to the configuration of MBSFN subframes of the LTE channel. The configuration of the LTE signals in an MBSFN subframe may be different than the configuration of the LTE signals in a non-MBSFN subframe.

In some examples, the UL/DL configuration 870 may correspond to a TDD frame structure used in the LTE channel. In other words, the UL/DL configuration 870 may specify the subframes used for UL (UL subframes) and the subframes used for DL (DL subframes). Accordingly, FIGS. 9-12 illustrate block flow diagrams of methods for supporting dynamic spectrum sharing between a legacy network and next generation network in accordance with various aspects of the present disclosure. In an aspect, the legacy network includes an LTE network, and the next generation network includes an NR network. The methods of FIGS. 9-12 may be described with reference to FIGS. 2-8, and may use the same reference numerals as in FIGS. 2-8 for ease of discussion.

Figure 9:
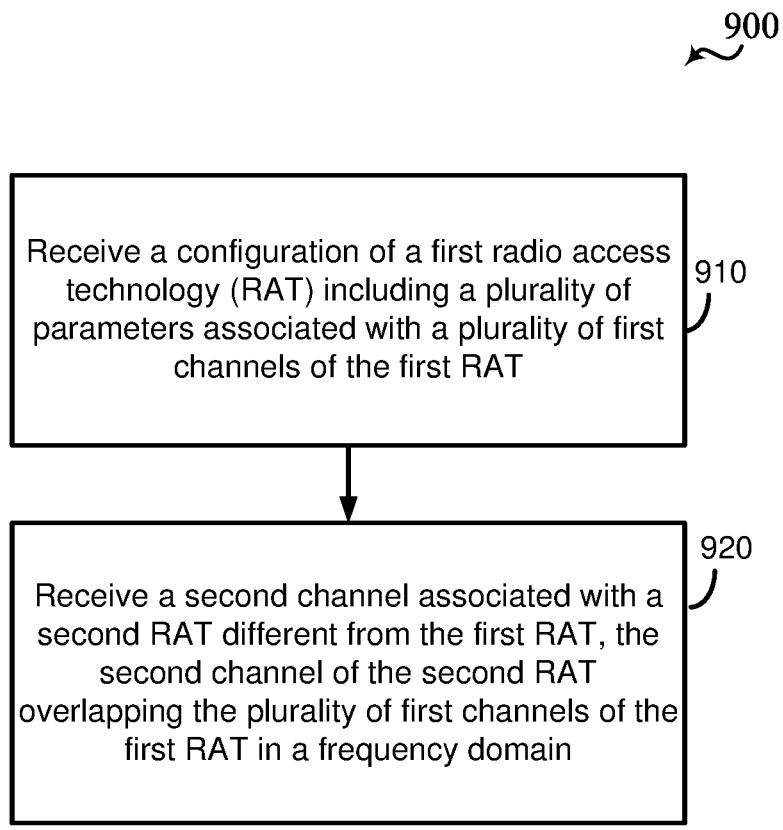
FIGS. 9-12 illustrate block flow diagrams of methods for supporting dynamic spectrum sharing between a legacy network and a next generation network in accordance with various aspects of the present disclosure.

In FIG. 9, a method 900 for supporting dynamic spectrum sharing between LTE and NR is provided. The operations of the method 900 may be implemented by a UE 115, 204 or its components as described herein with reference to FIGS. 15-16. In some examples, a UE 115, 204 may execute a set of codes to control the functional elements of the device to perform the functions described below. Additionally or alternatively, the UE 115, 204 may perform aspects of the functions described below using special-purpose hardware.

At block 910, a UE 115, 204 may receive a configuration of a first radio access technology (RAT) including a plurality of parameters associated with a plurality of first channels of the first RAT. The operations of block 910 may be performed according to the methods described herein. In an aspect, the first RAT may include an LTE RAT utilizing multiple LTE channels (e.g., LTE channels 420, 430, 440 in FIG. 4) for wireless communications. In some examples, the UE 115, 204 may receive the configuration including a plurality of parameters associated with the multiple LTE channels via a broadcast channel. For example, the broadcast channel may include a PBCH, and the configuration may be included in system information, such as remaining minimum system information (RMSI).

In other examples, the UE 115, 204 may receive the configuration including the plurality of parameters associated with the multiple LTE channels via a multicast channel. More specifically, the configuration may be sent in a group common down downlink control channel (e.g., GC-PDCCH). The UE 115, 204 may be included in a group of UEs that have been enabled for supporting dynamic spectrum sharing, and may receive the configuration in common control signaling.

In still other examples, the UE 115, 204 may receive the configuration including the plurality of parameters associated with multiple LTE channels via a unicast channel. For example, the UE 115, 204 may receive the configuration via RRC or higher layer signaling. In another example, the UE 115, 204 may receive the configuration via a MAC control element sent in a downlink control channel.

In some examples, the plurality of parameters may be associated with each LTE channel (e.g., LTE channel 420, 430, 440 in FIG. 4). The parameters may correspond to the parameters 810 disclosed in FIG. 8.

At block 920, the UE 115, 204 may receive a second channel associated with a second RAT different from the first RAT, the second channel of the second RAT overlapping the plurality of first channels of the first RAT in a frequency domain. The operations of block 920 may be performed according to the methods described herein. In an aspect, the second RAT may include an NR RAT utilizing an NR channel (e.g., NR channel 450 in FIG. 4).

In some examples, the UE 115, 204 may operate in the NR channel which overlaps the multiple LTE channels in the frequency domain. The NR channel and the LTE channels may be partitioned into a plurality of RBs. In an aspect, the RBs of the NR channel may substantially aligned with the RBs of the LTE channels in the frequency domain as shown in FIG. 5. In another aspect, the RBs of the NR channel may not be aligned with the RBs of the LTE channel in the frequency domain as shown in FIG. 7.

In some examples, the NR channel may include one or more portions that do not overlap with the multiple LTE channels. These portions may correspond to RBs that can fully be used by the base station (e.g., base station 202 in FIG. 2) without any rate matching around LTE signals and/or transmissions.

Figure 10:
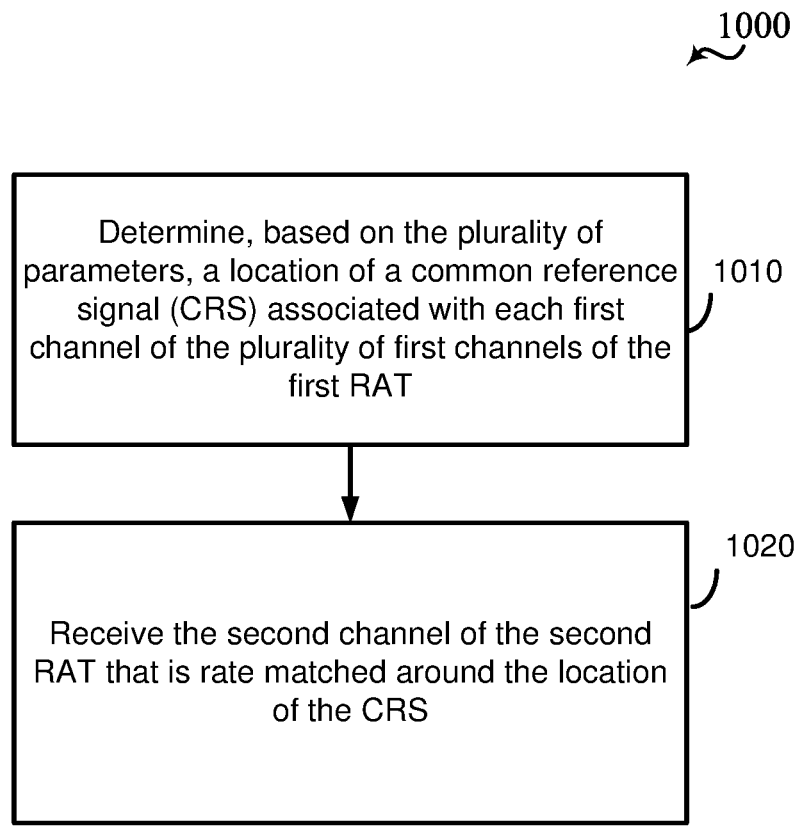

In FIG. 10, a method 1000 for supporting dynamic spectrum sharing between LTE and NR is provided. The operations of the method 1000 may be implemented by a UE 115, 204 or its components as described herein with reference to FIGS. 15-16. In some examples, a UE 115, 204 may execute a set of codes to control the functional elements of the device to perform the functions described below. Additionally or alternatively, the UE 115, 204 may perform aspects of the functions described below using special-purpose hardware.

At block 1010, a UE 115, 204 may determine, based on the plurality of parameters, a location of a common reference signal (CRS) associated with each first channel of the plurality of first channels of the first RAT. The operations of block 1010 may be performed according to the methods described herein. In an aspect, the UE 115, 204 may determine, based on the parameters (e.g., parameters 810 in FIG. 8), LTE signals that may be transmitted continuously or persistently. For example, cell-specific or common reference signals (CRS) may be transmitted in all subframes and across the entire bandwidth of each LTE channel. The UE 115, 204 may determine the configuration of the CRS based on the parameters of each LTE channel. More specifically, the UE 115, 204 may determine the location (e.g., REs 620 in FIG. 6) of the CRS associated with each LTE channel.

At block 1020, the UE 115, 204 may receive the second channel of the second RAT that is rate matched around the location of the CRS. The operations of block 1020 may be performed according to the methods described herein. In some examples, the UE 115, 204 may receive an NR channel or channel, such as PDCCH or PDSCH, that is rate matched around the location of the CRS.

In other examples, the second channel of the second RAT may include one or more portions that do not overlap the first channels of the first RAT. Accordingly, the UE 115, 204 may receive the one or more portions of the second channel that are not rate mated around the location of the CRS.

In some other examples, the RBs of the LTE channel may not aligned with RBs of the NR channel as disclosed in FIG. 7. The location of the CRS may be shifted in frequency domain due to the unalignment. Accordingly, the UE 115, 204 may adapt a rate matching around the location of the CRS based on a frequency offset (e.g., offset 750 in FIG. 7) between the second channel (e.g., NR channel 720 in FIG. 7) and each first channel (e.g., LTE channel 710 in FIG. 7).

Figure 11:
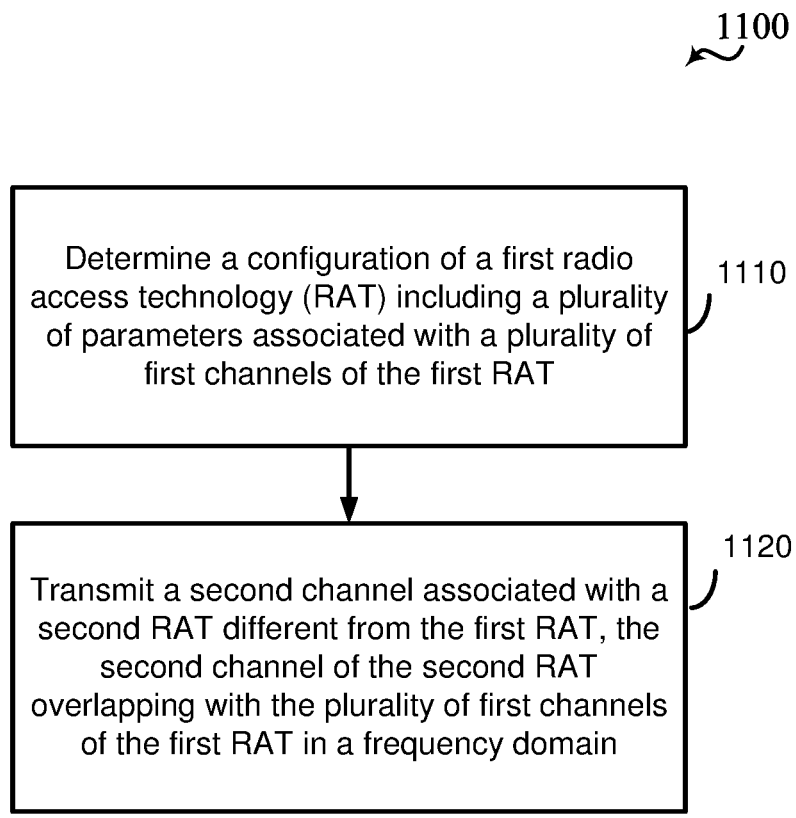

In FIG. 11, a method 1100 for supporting dynamic spectrum sharing between LTE and NR is provided. The operations of the method in FIG. 11 may be implemented by a base station 105, 202 or its components as described herein with reference to FIGS. 13-14. In some examples, a base station 105, 202 may execute a set of codes to control the functional elements of the device to perform the functions described below. Additionally or alternatively, the base station 105, 202 may perform aspects of the functions described below using special-purpose hardware.

At block 1110, a base station 105, 202 may determine a configuration of a first radio access technology (RAT) including a plurality of parameters associated with a plurality of first channels of the first RAT. The operations of block 1110 may be performed according to the methods described herein.

In some examples, the first RAT may include an LTE RAT utilizing multiple LTE channels (e.g., LTE channels 420, 430, 440 in FIG. 4) for wireless communications. The base station 105, 202 may determine the configuration of the LTE channels from another base station (e.g., base station 212 in FIG. 2) via a backhaul interface.

In some examples, the plurality of parameters may be associated with each LTE channel (e.g., LTE channel 420, 430, 440 in FIG. 4). The parameters may correspond to the parameters 810 disclosed in FIG. 8.

At block 1120, the base station 105, 202 may transmit a second channel associated with a second RAT different from the first RAT, the second channel of the second RAT overlapping with the plurality of first channels of the first RAT in a frequency domain. The operations of block 1120 may be performed according to the methods described herein. In some examples, the base station 105, 202 may transmit the configuration via a broadcast channel. More specifically, the broadcast channel may include a PBCH, and the configuration may be included in system information, such as remaining minimum system information (RMSI).

In other examples, the base station 105, 202 may transmit the configuration via a multicast channel. In such an embodiment, the configuration may be sent in a group common down downlink control channel (e.g., GC-PDCCH). The base station 105 may group some of its own UEs for micro-sleep operation, and may send the configuration, to the group of UEs, in common control signaling.

In still other examples, the base station 105, 202 may transmit the configuration via a unicast channel. More specifically, the base station 105, 202 may transmit the configuration via RRC or higher layer signaling. Alternatively, the base station may transmit the configuration via a MAC control element sent in a downlink control channel.

In an aspect, the second RAT may include an NR RAT utilizing an NR channel (e.g., NR channel 450 in FIG. 4).

In some examples, the base station 105, 202 may operate in the NR channel which overlaps the multiple LTE channels in the frequency domain. The NR channel and the LTE channels may be partitioned into a plurality of RBs. In an aspect, the RBs of the NR channel may substantially aligned with the RBs of the LTE channels in the frequency domain as shown in FIG. 5. In another aspect, the RBs of the NR channel may not be aligned with the RBs of the LTE channel in the frequency domain as shown in FIG. 7.

In some examples, the NR channel may include one or more portions that do not overlap with the multiple LTE channels. These portions may correspond to RBs that can fully be used by the base station 105, 202 without any rate matching around LTE signals and/or transmissions.

Figure 12:
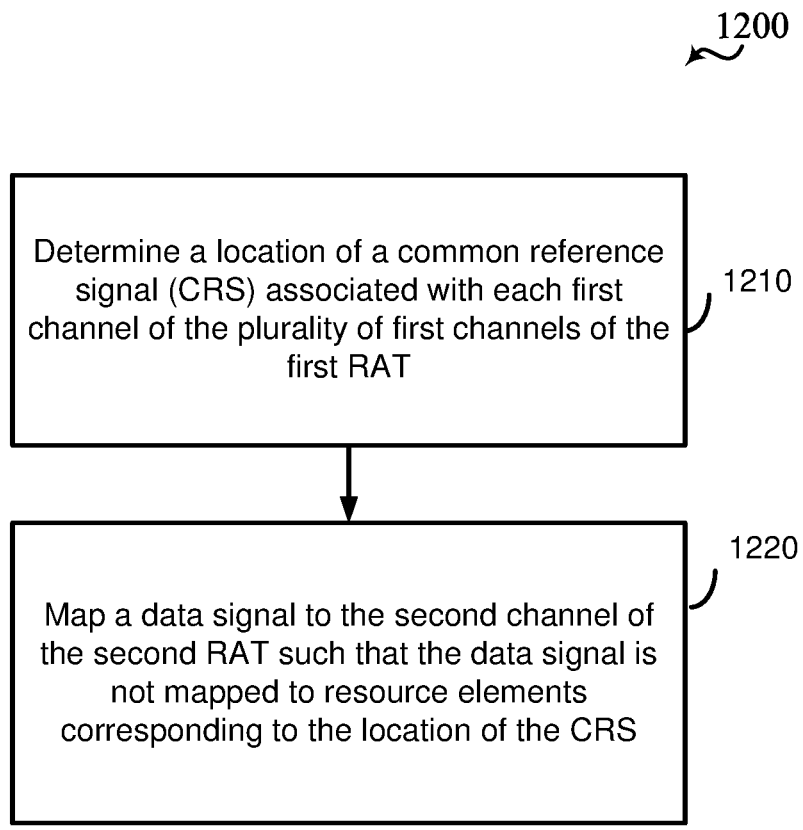

In FIG. 12, a method 1200 for supporting dynamic spectrum sharing between LTE and NR is provided. The operations of the method in FIG. 12 may be implemented by a base station 105, 202 or its components as described herein with reference to FIGS. 13-14. In some examples, a base station 105, 202 may execute a set of codes to control the functional elements of the device to perform the functions described below. Additionally or alternatively, the base station 105, 202 may perform aspects of the functions described below using special-purpose hardware.

At block 1210, a base station 105, 202 may determine a location of a common reference signal (CRS) associated with each first channel of the plurality of first channels of the first RAT. The operations of block 1210 may be performed according to the methods described herein.

In some examples, the base station 105, 202 may determine a location of the LTE signals that may be transmitted continuously or persistently in each LTE channel. For example, cell-specific or common reference signals (CRS) may be transmitted in all subframes and across the entire bandwidth of each LTE channel. More specifically, the base station 105, 202 may determine the location (e.g., REs 620 in FIG. 6) of the CRS transmitted in each LTE channel.

At block 1220, the base station 105, 202 may map a data signal to the second channel of the second RAT such that the data signal is not mapped to resource elements corresponding to the location of the CRS. The operations of block 1220 may be performed according to the methods described herein.

In some examples, NR signals, such as PDCCH, PDSCH or the like, may be rate matched around the LTE signals, such as CRS, to support dynamic spectrum sharing between LTE and NR. In this regard, the base station 105, 202 may map the NR signals to resource elements (e.g., REs 610 in FIG. 6) that are not occupied by the CRS (e.g., REs 620 in FIG. 6). In other words, the NR signals are not mapped to resource elements corresponding to the location of the CRS. In some other examples, other LTE signals may be rate matched around even though they are transmitted less frequently than the CRS, such as, channel state information reference signal (CSI-RS), synchronization signals (e.g., primary synchronization signal (PSS) and secondary synchronization signal (SSS)).

In some examples, the second channel may also include a portion that does not overlap with the first channels of the first RAT. In this regard, the base station 105, 202 may map the NR signal to all resource elements in this portion since no LTE signals are transmitted in the non-overlapping portion.

Figure 13:
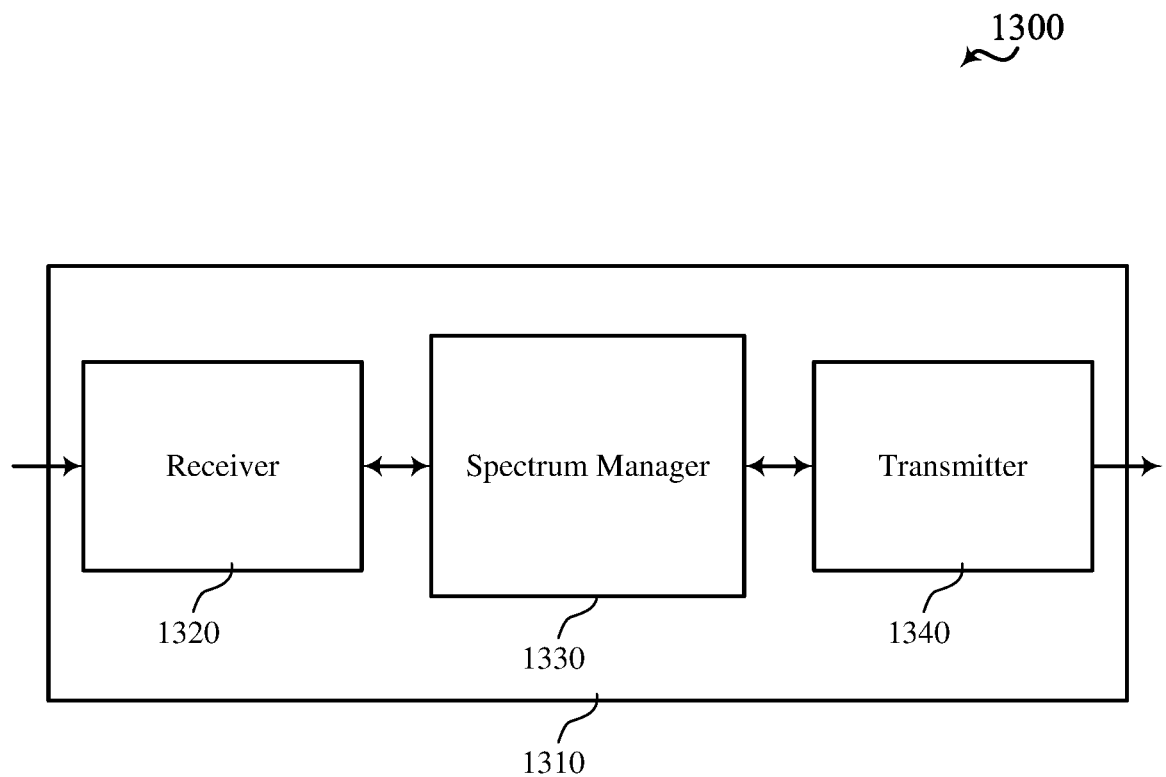
FIG. 13 illustrates a block diagrams of a device that supports dynamic spectrum sharing between a legacy network and a next generation network in accordance with aspects of the present disclosure.

FIG. 13 shows a block diagram 1300 of a wireless device 1310 that supports dynamic spectrum sharing between a legacy network and a next generation network in accordance with aspects of the present disclosure. In an aspect, the legacy network includes a LTE network, and the next generation network includes an NR network. Wireless device 1310 may be an example of aspects of a base station 105, 202 as described herein. Wireless device 1310 may include a receiver 1320, spectrum 1330, and transmitter 1340. Wireless device 1310 may also include a processor. Each of these components may be in communication with one another (e.g., via one or more buses).

Receiver 1320 may receive information such as packets, user data, or control information associated with various uplink channels such as PUCCH, PUSCH, PRACH, sounding reference signal (SRS), scheduling request (SR), and the like. Information may be passed on to other components of the device. The receiver 1320 may be an example of aspects of the transceiver 1435 described with reference to FIG. 14. The receiver 1320 may utilize a single antenna or a set of antennas.

Figure 14:
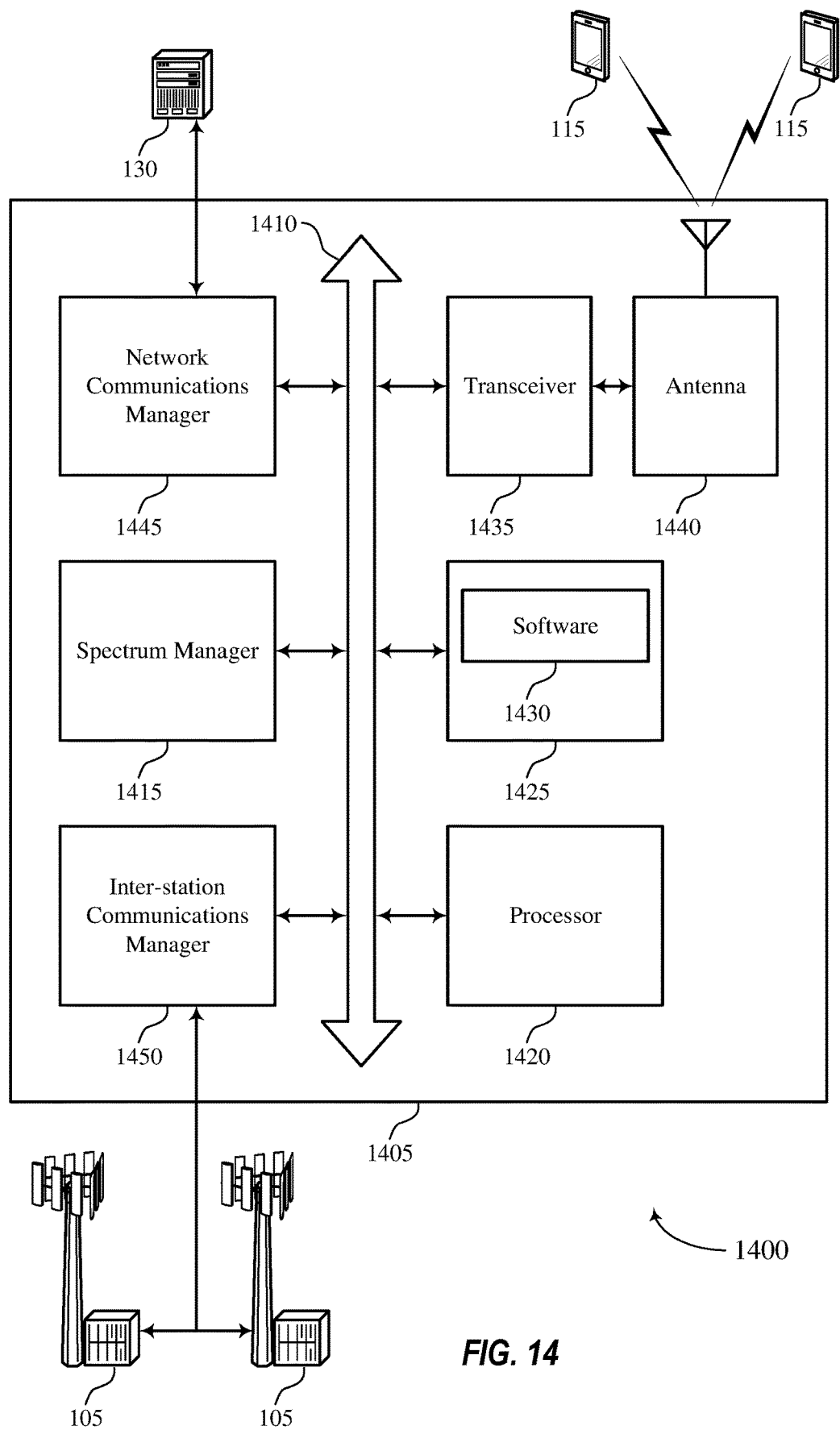
FIG. 14 illustrates a block diagram of a system including a base station that supports dynamic spectrum sharing between a legacy network and a next generation network in accordance with aspects of the present disclosure.

The spectrum manager 1330 may be an example of aspects of spectrum manager 1415 described with reference to FIG. 14.

The spectrum manager 1330 and/or at least some of its various sub-components may be implemented in hardware, software executed by a processor, firmware, or any combination thereof. If implemented in software executed by a processor, the functions of the spectrum manager 1330 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The spectrum manager 1330 and/or at least some of its various sub-components may be physically located at various positions, including being distributed such that portions of functions are implemented at different physical locations by one or more physical devices. In some examples, the spectrum manager 1330 and/or at least some of its various sub-components may be a separate and distinct component in accordance with various aspects of the present disclosure. In other examples, the spectrum manager 1330 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The spectrum manager 1330 may manage dynamic spectrum sharing between a legacy network, such as LTE, and a next generation network, such as NR, as described in various aspects and examples herein. In an aspect, the spectrum manager 1330 may be configured to determine a configuration of a first RAT including a plurality of parameters associated with a plurality of first channels of the first RAT, and to transmit a second channel associated with a second RAT different from the first RAT. The second channel of the second RAT may overlap with the plurality of first channels of the first RAT in a frequency domain.

Transmitter 1340 may transmit signals generated by other components of the device. In some examples, the transmitter 1340 may be collocated with a receiver 1320 in a transceiver module. For example, the transmitter 1340 may be an example of aspects of the transceiver 1035 described with reference to FIG. 10. The transmitter 1340 may utilize a single antenna or a set of antennas.

Transmitter 1340 may transmit information such as packets, user data, or control information associated downlink signals/channels such as PSS/SSS, PBCH, PHICH, PDCCH, PDSCH, and the like. In some examples, the transmitter 1340 may transmit FIG. 14 shows a diagram of a system 1400 including a device 1405 that supports dynamic spectrum sharing between a legacy network and a next generation network in accordance with aspects of the present disclosure. In an aspect, the legacy network includes a LTE network, and the next generation network includes an NR network. Device 1405 may be an example of or include the components of wireless device 910, or a base station 105, 202, 212 as described herein. Device 1405 may include components for bi-directional voice and data communications including components for transmitting and receiving communications, including UE micro-sleep manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more user equipment (UE)s 115, 204, 214.

The spectrum manager 1415 may manage dynamic spectrum sharing between a legacy network, such as LTE, and a next generation network, such as NR, as described in various aspects and examples herein. In an aspect, the spectrum manager 1415 may be configured to determine the parameters disclosed in FIG. 8, and manage the procedures disclosed in FIGS. 11 and 12.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting long term channel sensing in a shared spectrum).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support micro-sleep operation in a shared spectrum. The software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, 202, 212, and may include a controller or scheduler for controlling communications with UEs 115, 204, 214 in cooperation with other base stations 105, 202, 212. For example, the inter-station communications manager 1450 may coordinate scheduling for transmissions to UEs 115, 204, 212 for various interference mitigation techniques such as beamforming or joint transmission. In some examples, inter-station communications manager 1450 may provide an X2 interface within an NR wireless communication network technology to provide communication between base stations 105, 202, 212.

Figure 15:
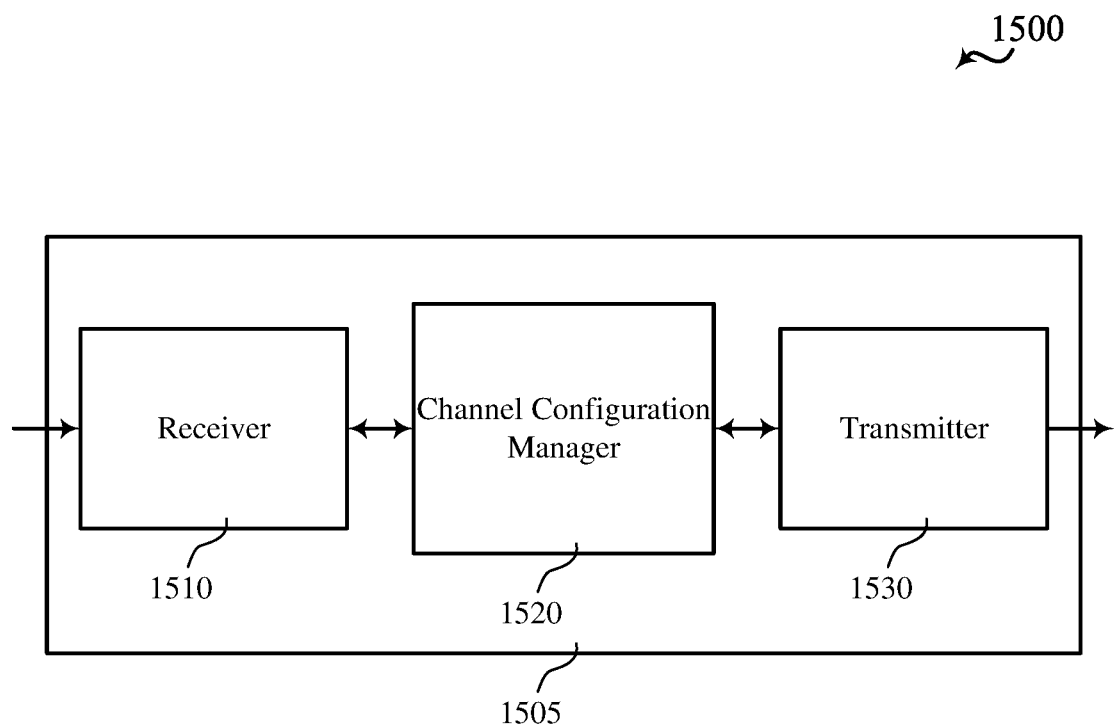
FIG. 15 illustrates a block diagram of a device that supports dynamic spectrum sharing between a legacy network and a next generation network in accordance with aspects of the present disclosure.

FIG. 15 shows a block diagram 1500 of a wireless device 1505 that supports dynamic spectrum sharing between a legacy network and a next generation network in accordance with aspects of the present disclosure. In an aspect, the legacy network includes an LTE network, and the next generation network includes an NR network. Wireless device 1505 may be an example of aspects of a UE 115, 204 as described herein. Wireless device 1505 may include receiver 1510, channel configuration manager 1520, and transmitter 1530. Wireless device 1505 may also include a processor. Each of these components may be in communication with one another (e.g., via one or more buses).

Receiver 1510 may receive information such as packets, user data, or control information associated downlink signals/channels such as PSS/SSS, PBCH, PHICH, PDCCH, PDSCH, and the like. Information may be passed on to other components of the device. The receiver 1510 may be an example of aspects of the transceiver 1635 described with reference to FIG. 16. The receiver 1510 may utilize a single antenna or a set of antennas.

The channel configuration manager 1520 may be an example of aspects of the channel configuration manager 1615 described with reference to FIG. 16.

The channel configuration manager 1520 and/or at least some of its various sub-components may be implemented in hardware, software executed by a processor, firmware, or any combination thereof. If implemented in software executed by a processor, the functions of the channel configuration manager 1520 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The channel configuration manager 1520 and/or at least some of its various sub-components may be physically located at various positions, including being distributed such that portions of functions are implemented at different physical locations by one or more physical devices. In some examples, channel configuration manager 1520 and/or at least some of its various sub-components may be a separate and distinct component in accordance with various aspects of the present disclosure. In other examples, the channel configuration manager 1520 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The channel configuration manager 1520 may manage a configuration including a plurality of parameters associated with multiple legacy channels, such as LTE carriers/channels, and next generation channels, such as NR carriers/channels for supporting dynamic spectrum sharing as described herein. The configuration may includes a plurality of parameters associated with one or more LTE channels. In an aspect, the channel configuration manager 1520 may be configured to receive a configuration of a first RAT including a plurality of parameters associated with a plurality of first channels of the first RAT, and to receive a second channel associated with a second RAT different from the first RAT. The second channel of the second RAT may overlap with the plurality of first channels of the first RAT in a frequency domain.

Transmitter 1530 may transmit signals generated by other components of the device. In some examples, the transmitter 1530 may be collocated with a receiver 1510 in a transceiver module. For example, the transmitter 1530 may be an example of aspects of the transceiver 1635 described with reference to FIG. 16. The transmitter 1530 may utilize a single antenna or a set of antennas.

Figure 16:
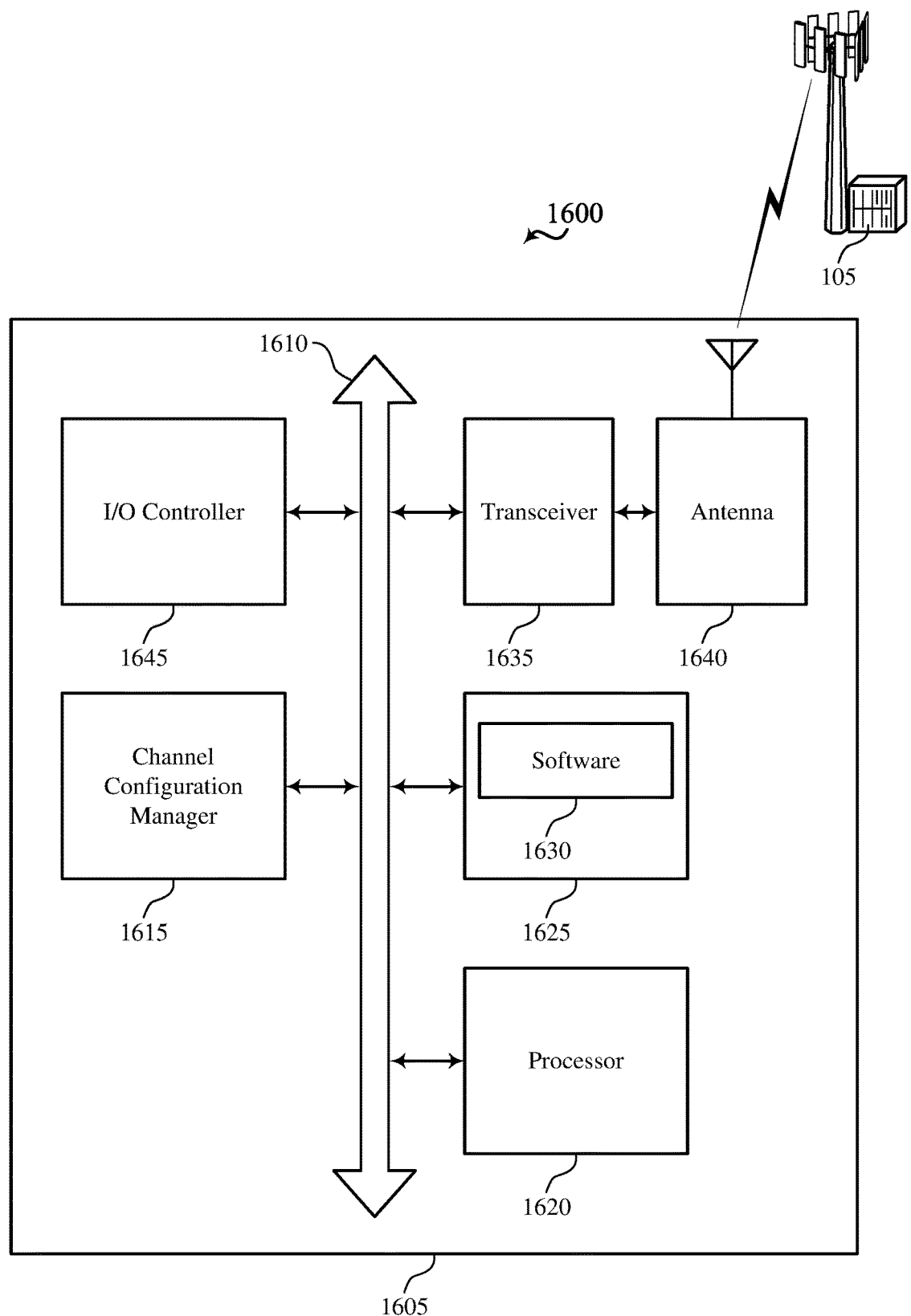
FIG. 16 illustrates a block diagram of a system including a UE that supports dynamic spectrum sharing between a legacy network and a next generation network in accordance with aspects of the present disclosure.

FIG. 16 shows a diagram of a system 1600 including a device 1605 that supports dynamic spectrum sharing between a legacy network and a next generation network in accordance with aspects of the present disclosure. In an aspect, the legacy network includes an LTE network, and the next generation network includes an NR network. Device 1605 may be an example of or include the components of UE 115, 204 as described above herein. Device 1605 may include components for bi-directional voice and data communications including components for transmitting and receiving communications, including channel configuration manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

The channel configuration manager 1615 may maintain the configuration parameters and manage various procedures to support dynamic spectrum sharing between LTE and NR as described herein. In an aspect, the channel configuration manager 1615 may be configured to maintain the parameters disclosed in FIG. 8, and manage the procedures disclosed in FIGS. 9 and 10.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting operation with multiple BW parts in a shared spectrum).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support multiple BW parts a shared spectrum. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. It should be noted that the base stations may be deployed by the same operator or different operators. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and system of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a user equipment (UE), a configuration of a first radio access technology (RAT) including a plurality of parameters associated with a plurality of first channels of the first RAT;
   determining, based on the plurality of parameters, a location of a common reference signal (CRS) associated with each first channel of the plurality of first channels;
   receiving, at the UE, a second channel associated with a second RAT different from the first RAT, wherein the second channel of the second RAT overlaps with the plurality of first channels of the first RAT in a frequency domain; and
   adapting a rate matching around the location of the CRS based on a frequency offset between the second channel and each first channel when RBs of the second channel are unaligned with RBs of the plurality of first channels in the frequency domain.

2. The method of claim 1, wherein at least one of the plurality of parameters is associated with each first channel of the plurality of first channels;
   wherein the at least one of the plurality of parameters includes a channel position, a bandwidth, a cell identification, a number of antenna ports, or a multicast broadcast single frequency network (MB SFN) configuration.

3. The method of claim 1, wherein the first RAT includes a long term evolution (LTE) network and wherein the second RAT includes a new radio (NR) network.

4. The method of claim 1, wherein the second channel further includes a portion that does not overlap with the plurality of first channels;
   wherein receiving the second channel comprises receiving the portion of the second channel that is not rate matched around the location of the CRS.

5. The method of claim 1, wherein the receiving the configuration comprises receiving, from a base station associated with the second RAT, the configuration via at least one of a broadcast channel, a multicast channel, or a unicast channel.

6. A method of wireless communications, comprising:
   determining, by a base station (BS), a configuration of a first radio access technology (RAT) including a plurality of parameters associated with a plurality of first channels of the first RAT;
   determining, based on the plurality of parameters, a location of a common specific reference signal (CRS) associated with each first channel of the plurality of first channels; and
   transmitting, from the BS, a second channel associated with a second RAT different from the first RAT, wherein the second channel of the second RAT overlaps with the plurality of first channels of the first RAT in a frequency domain, wherein rate matching is adapted around the location of the CRS based on a frequency offset between the second channel and each first channel when RBs of the second channel are unaligned with RBs of the plurality of first channels in the frequency domain.

7. The method of claim 6, wherein at least one of the plurality of parameters is associated with each first channel of the plurality of first channels;
   wherein the at least one of the plurality of parameters includes a channel position, a bandwidth, a cell identification, a number of antenna ports, a multicast broadcast single frequency network configuration, or an uplink/downlink configuration.

8. The method of claim 6, wherein the first RAT includes a long term evolution (LTE) network and wherein the second RAT includes a new radio (NR) network.

9. The method of claim 6, further comprising:
   mapping a signal to the second channel of the second RAT such that the signal is not mapped to resource elements corresponding to the location of the CRS.

10. The method of claim 6, wherein the second channel further includes a portion that does not overlap with the plurality of first channels.

11. The method of claim 10, further comprising mapping a signal to all resource elements in the portion of the second channel.

12. The method of claim 6, further comprising transmitting, to one or more user devices associated with the second RAT, the configuration via at least one of a broadcast channel, a multicast channel, or a unicast channel.

13. A user equipment (UE) for wireless communications, comprising:
   a processor;
   memory in electronic communication with the processor; and
   instructions stored in the memory, wherein the instructions are executable by the processor to:
     receive a configuration of a first radio access technology (RAT) including a plurality of parameters associated with a plurality of first channels of the first RAT,
     determining, based on the plurality of parameters, a location of a common specific refence signal (CRS) associated with each first channel of the plurality of first channels, receive a second channel associated with a second RAT different from the first RAT, wherein the second channel of the second RAT overlaps with the plurality of first channels of the first RAT in a frequency domain, and adapt a rate matching around the location of the CRS based on a frequency offset between the second channel and each first channel when RBs of the second channel are unaligned with RBs of the plurality of first channels in the frequency domain.

14. The UE of claim 13, wherein at least one of the plurality of parameters is associated with each first channel of the plurality of first channels;

wherein the at least one of the plurality of parameters includes a channel position, a bandwidth, a cell identification, a number of antenna ports, a multicast broadcast single frequency network configuration, or an uplink/downlink configuration.

15. The UE of claim 13, wherein the first RAT includes a long term evolution (LTE) network and wherein the second RAT includes a new radio (NR) network.

16. The UE of claim 13, wherein the second channel further includes a portion that does not overlap with the plurality of first channels;

wherein the instructions executable by the processor to receive the second channels are further executable by the processor to receive the portion of the second channel that is not rate matched around the location of the CRS.

17. The UE of claim 13, wherein the instruction executable by the processor to receive the configuration are further executable by the processor to receive, from a base station associated with the second RAT, the configuration via at least one of a broadcast channel, a multicast channel, or a unicast channel.

18. A base station (BS) for wireless communications, comprising:

a processor;

memory in electronic communication with the processor; and instructions stored in the memory, wherein the instructions are executable by the processor to:

determine a configuration of a first radio access technology (RAT) including a plurality of parameters associated with a plurality of first channels of the first RAT, determine, based on the plurality of parameters, a location of a common specific refence signal (CRS) associated with each first channel of the plurality of first channels, and transmit a second channel associated with a second RAT different from the first RAT, wherein the second channel of the second RAT overlaps with the plurality of first channels of the first RAT in a frequency domain, wherein rate matching is adapted around the location of the CRS based on a frequency offset between the second channel and each first channel when RBs of the second channel are unaligned with RBs of the plurality of first channels in the frequency domain.

19. The BS of claim 18, wherein at least one of the plurality of parameters is associated with each first channel of the plurality of first channels;

wherein the at least one of the plurality of parameters includes a channel position, a bandwidth, a cell identification, a number of antenna ports, a multicast broadcast single frequency network configuration, or an uplink/downlink configuration.

20. The BS of claim 18, wherein the first RAT includes a long term evolution (LTE) network and wherein the second RAT includes a new radio (NR) network.

21. The BS of claim 18, wherein the instructions are further executable by the processor to map a signal to the second channel of the second RAT such that the signal is not mapped to resource elements corresponding to the location of the CRS.

22. The BS of claim 18, wherein the second channel further includes a portion that does not overlap with the plurality of first channels, wherein the instructions are further executable by the processor to map a signal to all resource elements in the portion of the second channel.

23. The BS of claim 18, wherein the instructions are further executable by the processor to transmit, to one or more user devices associated with the second RAT, the configuration via at least one of a broadcast channel, a multicast channel, or a unicast channel.

* * * * *